Sept. 6, 1932. P. F. SHIVERS 1,875,509
PRESSURE REGULATOR FOR HOT WATER HEATING SYSTEMS
Filed Dec. 18, 1930
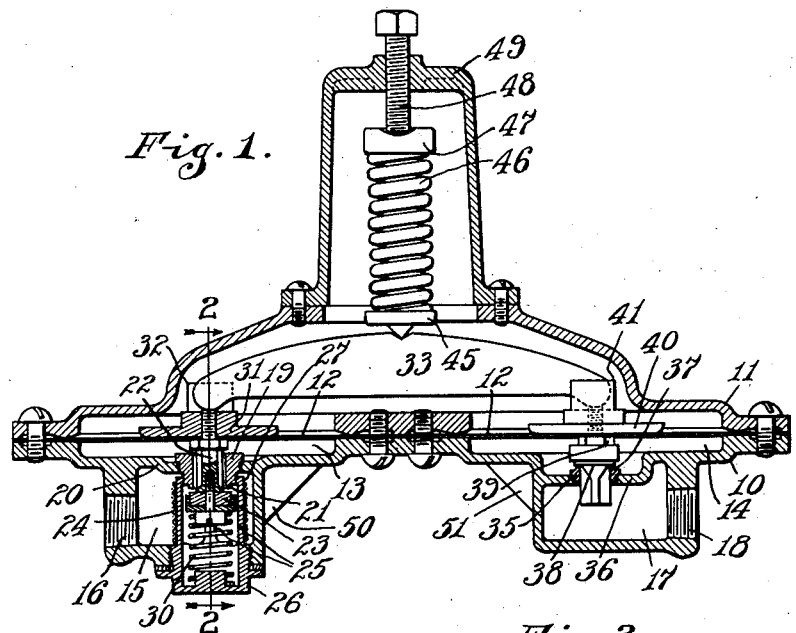
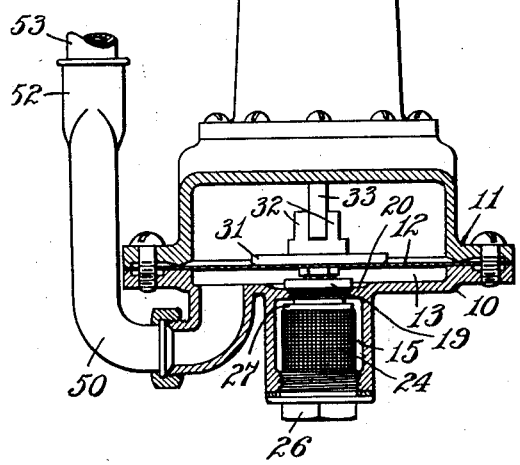
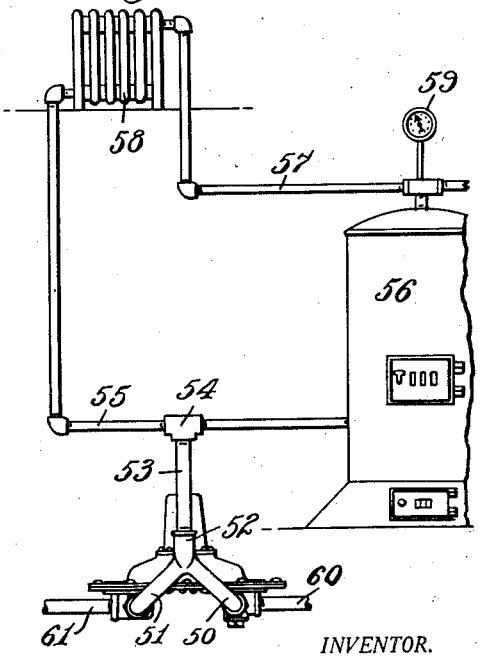
INVENTOR.
Paul F. Shivers,
BY
Hood + Hahn.
ATTORNEYS Patented Sept. 6, 1932

1,875,509

UNITED STATES PATENT OFFICE

PAUL F. SHIVERS, OF WABASH, INDIANA, ASSIGNOR TO MINNEAPOLIS-HONEYWELL REGULATOR COMPANY, OF MINNEAPOLIS, MINNESOTA, A CORPORATION OF DELAWARE

PRESSURE REGULATOR FOR HOT WATER HEATING SYSTEMS

Application filed December 18, 1930. Serial No. 503,189.

The object of my invention is to produce an effective device, for insertion in the water supply line of water heaters or steam generators, especially those types commonly used for house heating, by means of which a constant pressure, independent of the heat generated in the furnace, may be maintained in the fluid within the system, said pressure being a readily adjustable function of the water supply pressure.

The accompanying drawing illustrates my invention.

Fig. 1 is a medial section of my improved regulator;

Fig. 2 a section on line 2—2 of Fig. 1, and

Fig. 3 a diagram, on a smaller scale, illustrating an installation in which my improved regulator forms an element.

In the drawing 10 and 11 indicate mating castings between which is interposed a diaphragm 12 forming movable walls for the variable-volume inlet chamber 13 and the variable-volume drainage chamber 14. Adjacent chamber 13 is an inlet chamber 15 having an inlet opening 16 and adjacent chamber 14 is a drainage chamber 17 having a drainage passage 18. Communication between chambers 15 and 13 is through a valve seat nipple 19 threaded through partition 20 and provided at its end within chamber 15 with a valve seat 21. Projected through the bore of nipple 19, and guided therein in the usual manner by radiating circumferentially-separated fingers, is a valve stem 22 carrying a valve disc 23 arranged to seat upon seat 21.

Interposed between inlet 16 and seat 21 is a screen 24 supported by bars 25 carried by the inner end of a plug 26 and having their inner ends connected by a ring 27 which is sleeved over the inlet end of the nipple 19. A spring 30, nested in plug 26, acts upon valve 23 to urge said valve toward seat 21. Valve stem 22 is connected to that portion of diaphragm 12 which forms one wall of chamber 13 by a pressure plate 31 provided with a pair of fingers 32 between which is arranged one end of a lever 33.

Communication between chambers 14 and 17 is through a valve seat nipple 35 threaded through partition 36 and provided with seat 37. Sleeved through nipple 35, in a common manner, is a valve 38 adapted to seat upon seat 37 and provided with a stem 39 connected by pressure plate 40 with that portion of diaphragm 12 which forms one wall of chamber 14. Pressure plate 40 is provided with a pair of ears 41 between which the other end of lever 33 lies.

A spring seat 45, upon which lever 33 is fulcrumed, receives one end of a spring 46, the other end of which engages the abutment 47 which is adjustable by means of screw 48 threaded through a yoke 49 carried by the casing member 11.

Chamber 13 is provided with an outlet passage 50 and chamber 14 is provided with an inlet passage 51. The two passages 50 and 51 are brought together in a delivery passage 52 adapted to receive a pipe nipple 53 connected to a T 54 in the return line 55 of a water heater 56, the delivery side of which is connected by piping 57 with radiating element 58 which in turn delivers to return pipe 55. As is usual, a pressure gauge 59 may be provided to indicate pressures within the system. A water supply pipe 60 is connected to the inlet 16 and a drain pipe 61 leads from the outlet 18.

The operation is as follows:

Lever 33 acts to open valve 23 against the action of spring 30, and to close valve 38.

Supply water entering chamber 15 passes through nipple 19, chamber 13, passage 50 and pipes 53 and 55 into the heating system and the flow continues until the pressure in chamber 13 is sufficient to counterbalance the effect of spring 46 and permit spring 30 to close valve 23, valve 38 remaining closed.

As the water in the system becomes heated its pressure increases and, when there has been a sufficient increase, it acts upon that portion of diaphragm 12 which forms one wall of chamber 14 to raise valve 37 from its seat and permit a sufficient quantity of water to pass from the system to the drain to maintain the desired maximum pressure within the heating system.

Upon sufficient cooling of the system and consequent decrease of pressure upon diaphragm 12 in chamber 13, valve 23 is urged away from its seat 21 by the action of spring 46 through lever 33 to permit the entry of a sufficient amount of water to restore the pressure to normal.

It will be noted that by the use of my improved device as an element of a hot water heating system it is possible to keep the water under a desired maximum pressure so that the boiling point of the water may thus be raised and thus make possible the circulation of water at a temperature higher than 212, thereby increasing the efficiency of the radiators.

While I have shown a construction in which the spring 46 acts medially between the two ends of lever 33, and in which the diaphragm elements of the two chambers 13 and 14 are equal, it will be readily understood that the spring 46 and/or the diaphragms may be arranged to act differentially upon the two valves 23 and 38, depending upon the relationship which is desired and upon the differential which is desired between the water supply pressure and the desired maximum pressure within the system. By adjusting screw 48, the effect of spring 46 upon the two valves 23 and 38 may be adjusted and the operating pressure within the system thus raised or lowered.

It will of course be understood that the relative effects of normal working pressure within the variable-volume inlet chamber 13 and variable-volume drainage chamber 14 will be dependent upon the relative effective areas of the diaphragm walls thereof and upon the position of the fulcrum of lever 33, and that, therefore, the parts may be so proportioned that, under working conditions where the pressure in the pipe 53 and parts of the system beyond said pipe is less than the normal desired working pressure, valve 23 will be pressure-biased to open position.

It will be noted that in a device of the character described adjustment for different normal working pressures is obtainable by adjustment of the effective working strength of the single spring 46. I consider it an important feature because it limits the necessity of coordinated adjustments of two or more adjustable elements.

Of course, any variable-volume chamber must have at least one bounding wall which is variable either as to position or as to shape or size; or it must contain an element which is variable as to position or size to occupy a greater or less proportion of the total volume of the chamber. Such an element is necessarily implied in the term "variable-volume chamber". In the claims, I have used the term "variable element" to define that type of element.

I claim as my invention:

1. A pressure regulator comprising an inlet, a delivery passage and a drainage outlet, a variable-volume inlet chamber, flow-controlling member interposed between said inlet and said variable-volume inlet chamber and connected to the variable element of said variable-volume inlet chamber, means for normally urging said flow-controlling member to flow-obstructing position, a variable-volume drainage chamber, a flow-controlling member interposed between the variable-volume drainage chamber and the drainage outlet and positioned by the variable element of the variable-volume drainage chamber, a single yielding means acting simultaneously upon the variable elements of the two variable-volume chambers, and communicating connections between the delivery passage and the two variable-volume chambers.

2. A pressure regulator comprising an inlet, a delivery passage and a drainage outlet, a variable-volume inlet chamber, a flow-controlling member interposed between said inlet and said variable-volume inlet chamber and connected to the variable element of said variable-volume chamber, means for normally urging said flow-controlling member to flow-obstructing position, a variable-volume drainage chamber, a flow-controlling member interposed between the variable-volume drainage chamber and the drainage outlet and positioned by the variable element of the variable-volume drainage chamber, a single yielding means acting simultaneously upon the variable elements of the two variable-volume chambers, means by which the effectiveness of said yielding means may be increased or diminished, and communicating connection between the delivery passage and the two variable-volume chambers.

3. A pressure regulator comprising an inlet, a delivery passage and a drainage outlet, a variable-volume inlet chamber, a flow-controlling member interposed between said inlet and said variable-volume inlet chamber and associated with the variable element of said variable-volume inlet chamber to partake of the movements thereof, a variable-volume drainage chamber, a flow-controlling member interposed between the variable-volume drainage chamber and the drainage outlet and associated with the variable element of said variable volume drainage chamber to partake of the movements thereof, a single yielding means acting simultaneously upon the variable elements of the two variable volume chambers so co-related therewith as to shift one of the flow-controlling members to open position at a predetermined working pressure and communicating connections between the delivery passage and the two variable-volume chambers.

4. A pressure regulator comprising an inlet, a delivery passage and a drainage outlet, a variable-volume inlet chamber, a flow-controlling member interposed between said inlet and said variable-volume inlet chamber and associated with the variable element of said variable-volume inlet chamber to partake of the movements thereof, a variable-volume drainage chamber, a flow-controlling member interposed between the variable-volume drainage chamber and the drainage outlet and associated with the variable element of said variable-volume drainage chamber to partake of the movements thereof, a single yielding means acting simultaneously upon the variable elements of the two variable-volume chambers so co-related therewith as to shift one of the flow-controlling members to open position at a predetermined working pressure, means by which the effectiveness of said yielding means may be increased or diminished and communicating connections between the delivery passage and the two variable-volume chambers.

5. A pressure regulator comprising an inlet, a delivery passage and a drainage outlet, a variable-volume inlet chamber, a flow-controlling member interposed between said inlet and said variable-volume inlet chamber and associated with the variable element of said variable-volume inlet chamber to partake of the movements thereof, a variable-volume drainage chamber, a flow-controlling member interposed between the variable volume drainage chamber and the drainage outlet and associated with the variable element of said variable-volume drainage chamber to partake of the movements thereof, a lever arranged to act simultaneously upon the two variable elements of the two variable-volume chambers, a spring associated with said lever and resisting movement thereof in response to volume increase in either of said chambers, and communicating connections between the delivery passage and the two variable-volume chambers.

6. A pressure regulator comprising an inlet, a delivery passage and a drainage outlet, a variable-volume inlet chamber, a flow-controlling member interposed between said inlet and said variable-volume inlet chamber and associated with the variable element of said variable-volume inlet chamber to partake of the movements thereof, a variable-volume drainage chamber, a flow-controlling member interposed between the variable-volume drainage chamber and the drainage outlet and associated with the variable element of said variable-volume drainage chamber to partake of the movements thereof, a lever arranged to act simultaneously upon the two variable elements of the two variable-volume chambers, a spring engaging said lever intermediate the ends thereof, means by which the effectiveness of said spring may be increased or diminished, and communicating connections between the delivery passage and the two variable-volume chambers.

In witness whereof, I Paul F. Shivers have hereunto set my hand at Wabash, Indiana, this 11th day of December, A. D. one thousand nine hundred and thirty.

PAUL F. SHIVERS.